United States Patent [19]

Araujo

[11] Patent Number: 4,812,654

[45] Date of Patent: Mar. 14, 1989

[54] TWO-AXIS QUARTZ FIBER PASSIVE TILT METER

[75] Inventor: Richard K. Araujo, Tewksbury, Mass.

[73] Assignee: The Charles Stark Draper Laboratory, Inc., Cambridge, Mass.

[21] Appl. No.: 946,885

[22] Filed: Dec. 29, 1986

[51] Int. Cl.$^4$ .............................................. G01C 9/06
[52] U.S. Cl. ................................. 250/338.1; 33/366; 33/392
[58] Field of Search ............ 250/338 R, 341; 33/391, 33/392, 365, 348, 366

[56] References Cited

U.S. PATENT DOCUMENTS

| | | | |
|---|---|---|---|
| 2,876,672 | 3/1959 | Buckley et al. | 33/392 |
| 3,097,565 | 7/1963 | Kupelian | 33/366 |
| 3,727,055 | 4/1973 | David et al. | 250/338 |
| 4,592,147 | 6/1986 | Herman | 33/392 |
| 4,627,172 | 12/1986 | Afromowitz | 33/392 |

FOREIGN PATENT DOCUMENTS

| | | | |
|---|---|---|---|
| 8500817 | 5/1986 | Netherlands | 33/391 |
| 1182260 | 9/1985 | U.S.S.R. | 33/366 |
| 2074315 | 10/1981 | United Kingdom | 33/366 |

Primary Examiner—Janice A. Howell
Assistant Examiner—William F. Rauchholz
Attorney, Agent, or Firm—Joseph S. Iandiorio; Brian M. Dingman

[57] ABSTRACT

A two-axis quartz fiber passive tilt meter which includes housing and a quartz fiber suspended from the housing for conducting radiation and emitting the radiation from a distal end thereof. A pendulous mass is suspended from the quartz fiber and a damping fluid in the housing surrounds the quartz fiber and the mass. A detector senses the position of the spot of radiation emitted from the quartz fiber.

14 Claims, 3 Drawing Sheets

TWO-AXIS QUARTZ FIBER PASSIVE TILT METER

FIELD OF INVENTION

This invention relates to a two-axis quartz fiber passive tilt meter for measuring the inclination of a surface.

BACKGROUND OF INVENTION

Various devices have been used to determine the degree of tilt of a surface. For example, conventional bubble levels are widely utilized in construction and many other applications. However, the use of such devices is limited because most bubble levels are operable about only a single axis. These instruments are also generally ineffective for measuring very small angles of inclination. Moreover, when such a level is tilted the bubble often tends to stick in its glass tube due to surface anomalies in the tube. As a result, inaccurate measurements may be provided.

In a more sophisticated device such as a capacitor pick-off or an electrolytic bubble level, the bubble is typically included in an electrical circuit. As the apparatus is tilted the bubble shifts position thereby altering various electrical characteristics, e.g., capacitance, resistance, in the circuit. One such device employs a chamber filled with an electrolytic fluid that contains the bubble. A flexure extends from the chamber to a support base and a number of electrodes extend into the fluid. As the flexure tilts one or more of the electrodes are exposed by the bubble and the resistance in the circuit increases. Servo-drive mechanisms are then activated to restore the flexure to its original condition and determine the degree of tilt of the surface in question. Inasmuch as it requires a flexure and servo-drive mechanism, this apparatus is rather complex and expensive. It also exhibits the bubble-sticking problem and to reduce this difficulty the device typically employs an expensive gold plating.

An alternative instrument employs a pendulous mirror mounted by a knife-edge structure on a sapphire bearing surface. The lower end of the pendulum is immersed in a damping fluid. An autocollimator mounted on the housing of the apparatus detects changes in the relative position of the mirror as the housing and autocollimator are tilted. This device is also relatively expensive and intricate and must be calibrated regularly. It requires an autocollimator and its bearing surface often exhibits stickiness which hinders movement of the pendulum.

Accelerometers may be employed to determine surface inclination. However, such devices have wider frequency responses and tend to detect even very high frequency vibrations. As a result, they may sense even minor, transitory and brief disturbances which are not indicative of surface inclination. This makes them inconvenient for use as tilt meters which typically respond to a relatively slow displacement. Even if damped to eliminate high-frequency vibrations, accelerometers exhibit a number of disadvantages when used in this manner. Typically, they are active devices which require an additional active element such as a servo mechanism or coil to restore or correct a tilted component. These active elements indirectly measure the degree of displacement and therefore the surface inclination. In addition to their added structure, complexity and cost, accelerometers are often unsatisfactory because they employ magnetic components and, as a result, tend to be ineffective when used in a strong magnetic field.

SUMMARY OF INVENTION

It is therefore an object of this invention to provide an improved two-axis quartz fiber passive tilt meter that does not require active elements to measure displacement.

It is a further object of this invention to provide a two-axis quartz fiber passive tilt meter that is relatively uncomplicated and inexpensive.

It is a further object of this invention to provide a two-axis quartz fiber passive tilt meter that is sensitive to very small degrees of tilt and which may be effectively utilized about two axes.

It is a further object of tis invention to provide a two-axis quartz fiber passive tilt meter that is effectively damped to reduce sensitivity to high-frequency vibrations.

It is a further object of this invention to provide a two-axis quartz fiber passive tilt meter that is damped by a damping fluid which also serves as cladding for the quartz fiber.

It is a further object of this invention to provide a two-axis quartz fiber passive tilt meter which has low internal hysteresis and responds to tilting freely and reliably without sticking.

It is a further object of this invention to provide a two-axis quartz fiber passive tilt meter which operates effectively in strong magnetic fields.

It is a further object of this invention to provide a two-axis quartz fiber passive tilt meter which is rugged and safely transportable.

This invention results from the realization that an improved, simplified, less expensive and yet highly accurate passive two-axis tilt meter may be provided by suspending a radiation-conducting quartz fiber from a housing, suspending a pendulous mass proximate the light emitting distal end of the fiber and employing a detector below the light-emitting end of the quartz fiber to detect the position of a spot of the radiation and, as a result, the degree of inclination of the instrument.

This invention features a two-axis quartz fiber passive tilt meter including a housing and a quartz fiber suspended from the housing for conducting radiation and emitting the radiation from a distal end thereof. There is a pendulous mass suspended from the quartz fiber and a damping fluid in the housing surrounds the quartz fiber and the mass. There are detector means for sensing the position of a spot of radiation emitted from the quartz fiber.

In a preferred embodiment, the device further includes a mechanical stop mounted within the housing for limiting tilting by the quartz fiber. The mechanical stop may include tube means which surround the quartz fiber and the pendulous mass. Fluid communication means may interconnect the tube means and the interior of the housing for transmitting damping fluid therethrough.

The quartz fiber may be disposed through the pendulous mass and the pendulous mass may be suspended proximate the distal end of the quartz fiber. Preferably the tilt meter is constructed of nonmagnetic material.

A source of radiation may be mounted in the housing for introducing radiation to the fiber. That source of radiation may include a light-emitting diode. Infrared radiation may be conducted through the quartz fiber and preferably such radiation includes a wavelength of 880 nanometers.

The detector means may include a sensor and lens means for directing the radiation emitted by the quartz fiber to a spot on the sensor. Such detector means may include a four-quadrant detector. A window may be mounted in the housing between the light-emitting end of the quartz fiber and the detector means.

DISCLOSURE OF PREFERRED EMBODIMENT

Other objects, features and advantages will occur from the following description of a preferred embodiment and the accompanying drawings, in which.

Figure 1:
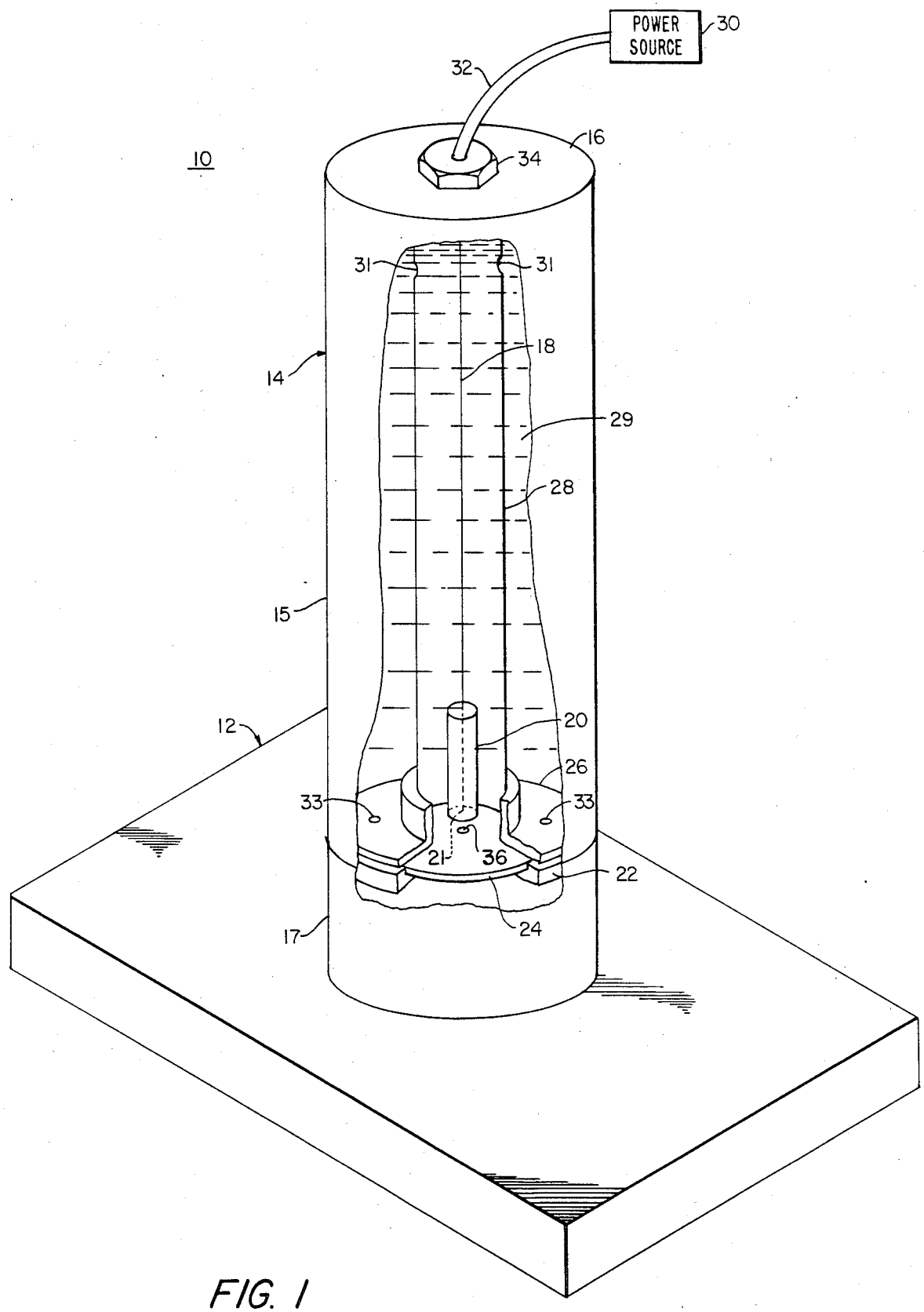
FIG. 1 is an axonometric partly cutaway view of a two-axis quartz fiber passive tilt meter according to this invention.

A two-axis quartz fiber passive tilt meter according to this invention may be accomplished by providing a housing which is constructed of aluminum or other nonmagnetic material. A quartz fiber is suspended within the housing for conducting radiation and emitting the radiation from a distal end thereof. Typically, the quartz fiber is extremely thin, for example, approximately 300 microns in diameter. Such a quartz fiber exhibits very low internal hysteresis and responds freely and reliably to tilting without sticking. To improve the pendulous force and response even further a pendulous mass is suspended from the quartz fiber within the housing. This mass is typically composed of brass or similarly massive material. Preferably, the quartz fiber is disposed through the pendulous mass and the mass is suspended proximate the distal end of the quartz fiber. A clad quartz fiber such as QSF300A could also be used.

A damping fluid within the housing surrounds the quartz fiber and the pendulous mass. Typically, a viscous fluid such as DC200 silicon oil is used. This fluid damps high-frequency vibrations of the suspended quartz fiber and pendulous mass and thus enables the device to detect low-frequency vibrations which are indicative of the inclination of the surface on which the tilt meter is placed. The index of refraction of the viscous damping fluid is selected so that it also serves as cladding for the optical quartz fiber. The index of refraction of the quartz is typically 1.49 and the index of refraction of the damping fluid may be 1.403. The fluid further serves to protect the surface of the quartz fiber from Griffith cracks which would otherwise result from moisture attacking the fiber. Additionally, it serves as a buffer to protect the fiber from drastic changes in the surrounding environment.

The degree of inclination is sensed by a detector which senses the position of a spot of radiation emitted from the quartz fiber. A preferred detector includes a four-quadrant diode detector such as the UV-104BQ-4 model manufactured by EG&G Electro Optics. A source of preferably infrared radiation in the vicinity of 880 nanometers is mounted on or near the housing for introducing radiation to the quartz fiber. Typically, an LED, or in the case of infrared radiation, an IRED is utilized. One or more lenses may be employed for directing the radiation emitted by the quartz fiber to a spot on the four-quadrant diode or other sensor. A window or slide is mounted in the housing between the light-emitting end of the quartz fiber and the detector. A 30° cone of radiation from the fiber typically provides a one-to-one image on the detector. A four-quadrant diode is preferred because a symmetrical spot and accurate measurements are yielded regardless of the length of the instrument or size of the image. In fact, the tilt meter achieves a sensitivity of better than 0.01 arc second.

A tube or other mechanical stop, preferably composed of aluminum or similar nonmagnetic material, may be constructed within the housing to surround the quartz fiber and the pendulous mass. This stop limits the extent to which the quartz fiber can bend. As a result, it prevents the fiber from bending excessively and breaking under the weight of the mass if the device is inverted such as during transportation. Communication holes or channels typically interconnect the tube and the interior of the housing so that the damping fluid may be transmitted between the interior of the tube and the housing.

Because the device does not require active servos or other mechanisms for determining inclination, it is relatively inexpensive and uncomplicated to manufacture. Moreover, because it preferably employs nonmagnetic material it works well in even strong, e.g., 5 kilogauss, magnetic fields.

There is shown in FIG. 1 the two-axis quartz fiber passive tilt meter 10 which is mounted on a table 12 in order to measure the inclination of the table. Tilt meter 10 includes an elongate housing 14 having upper and lower housing portions 15 and 17 with a cap 16 attached at upper end of housing portion 15. A thin quartz fiber 18 with very low internal hysteresis is suspended from cap 16 and a pendulous mass 20 is suspended from the distal end of quartz fiber 18. In particular, fiber 18 extends entirely through mass 20 and includes a light-emitting end 21 at the bottom of the pendulous mass. A collar 22 is mounted within housing section 15 for surrounding and mounting a window or a slide 24 below pendulous mass 20. A flange 26 which is spaced above the upper surface of collar 22 (see FIG. 2) surrounds and engages the lower end of a tubular stop 28 and fits snuggly against the inner wall of housing portion 15. This flange prevents the lower end of stop 18 from tilting toward the walls of housing portion 15. Stop 28 extends upwardly and its upper end is received in a recess 27, FIG. 2, in cap 16 of housing 18. The upper end of stop 28 is secured as described more fully below.

Housing 10 is filled with a damping fluid 29 above collar 22 and window 24. Holes 31 in tubular stop 28 and holes 33 in flange 26 provide for fluid communication between the interior of housing 14 and the interior of tubular stop 28. As a result, fluid 29 fills tubular stop 28 and acts as optical cladding for quartz fiber 18. This enables fiber 18 to serve as an optical fiber.

A power source 30 is connected by a wire 32 which extends through a holder 34 in cap 16 to a infrared-emitting diode (IRED), not shown in FIG. 1 but described in connection with FIG. 2. The IRED emits radiation in the wavelength region of 880 nanometers which is transmitted by optical fiber 18 and emitted from the end of the fiber as radiation 36 which impinges on window 24. This radiation is transmitted through window 24 and directed by a lens system, not shown in FIG. 1 but described more fully in connection with FIG. 2, to a detector which senses the location of radiation 36 and provides a signal representative of this information to processing electronics which may be contained within or otherwise associated with lower portion 17 of housing 14. The information is then processed to determine the degree of inclination of tilt meter 10 and, accordingly, table 12.

Figure 2:
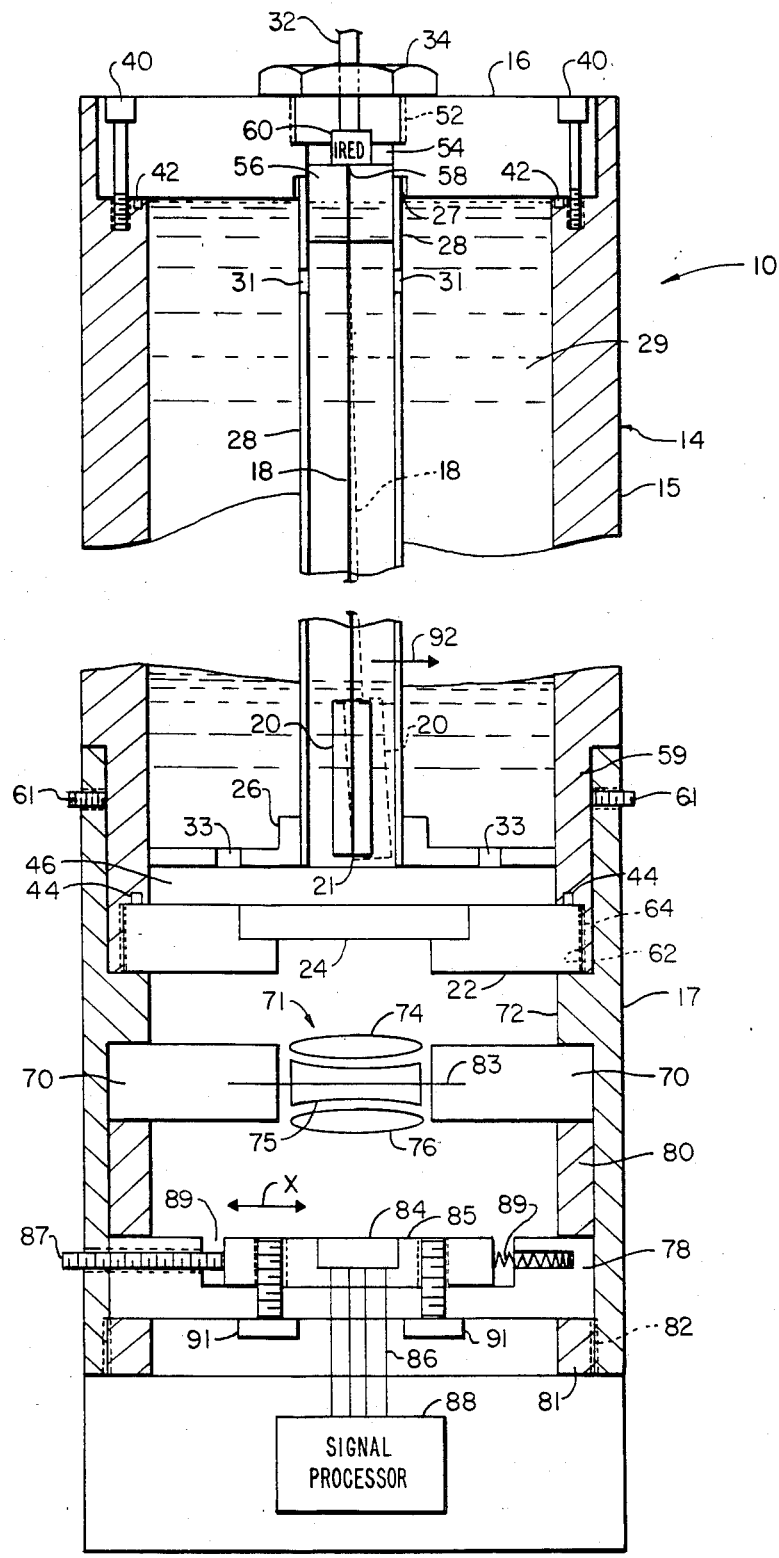
FIG. 2 is an elevational cross-sectional view of the two-axis quartz fiber passive tilt meter of FIG. 1.

As shown in FIG. 2, cap 16 is attached to cylindrical housing portion 15 by threaded bolts 40. An O-ring seal 42 is disposed between housing portion 15 and cap 16 to prevent fluid 29 from leaking from housing 14. A similar O-ring seal 44 is disposed between the bottom of housing portion 15 and collar 22 to prevent fluid from leaking out of the housing or from the upper housing portion 15 to the lower housing portion 17.

Flange 26 surrounds tubular stop 28 and separates the stop from window 24. The flange is spaced slightly from collar 22 so that a space 46 is provided for transmitting fluid via holes 33 between the interior of housing portion 15 and the interior of tubular stop 28. Holes 31 are likewise provided in the upper portion of the tubular stop for such fluid communication.

Cap 16 includes an upper threaded recessed portion 52 and a lower recessed portion 54 adjoining recess 27. Threaded recessed portion 52 engageably receives threaded holder 34. Lower recessed portion 54 receives the upper end of a cylindrical mounting member 56 which is attached by a suitable adhesive to cap 16. The lower portion of member 56 is received within the upper end of tubular stop 28. As a result, the tubular stop is secured at its upper end by member 56 and recess 27 and at its lower end by flange 26 so that it is firmly mounted within housing 14. The upper end of quartz fiber 18 extends completely through mounting member 56 and is secured to the mounting member such as by a capillary bond formed with a suitable adhesive, for example FA 8/45 epoxy manufactured by Bacon Industries, so that optical fiber 18 is securely suspended from cap 16 of housing 14. The upper end 58 of the quartz fiber is located at the upper surface of the mounting member. Wire 32 extends through connector 34 and is attached to an IRED 60 which engages the upper surface of mounting member 56 and, in particular, the upper end 58 of optical fiber 18.

Housing portion 15 includes a flange 59 which is received by the open upper end of housing portion 17. Four equally spaced set screws 61 (two of which are shown) are tightened to fix together the upper and lower housing portions. Collar 22 includes a threaded circumference 62 which is secured to a complementary threaded inside circumference 64 proximate the lower end of housing portion 15. Window 24 is attached by cement or other adhesive means within collar 22. A compound lens system 71 including a lens collar 70 is mounted within housing portion 17 and is separated from collar 22 by a ridge 72 of housing portion 15. The lens system is a Hastings triplet and includes a pair of double convex lenses 74 and 76 with a double concave lens 75 which are mounted centrally within collar 70 beneath window 24 and lower end 21 of optical fiber 18. A detector collar 78 is spaced from lens collar 70 by spacing element 80 and is secured in place by an end collar 81 which is threadably attached at 82 to the inside circumference of lower housing portion 17. A four-quadrant detector 84 is mounted in an adjustment piece 85 which is received in central recess 89 of collar 78 so that it is disposed beneath lens system 71 and the lower end 21 of optical fiber 18.

Detector 84 may be adjusted so that when no degree of tilt is present a spot of light is centered on the detector. Such adjustment is accomplished by a pair of perpendicularly aligned set screws 87 (only one of which is shown) which extend through housing portion 17 and collar 78 to bear on adjustment piece 85, and a pair of resilient elements 89 (only one of which is shown) which oppose set screws 87 and are mounted in collar 78. The set screw and resilient member which are not shown are arranged at 90° to those which are shown In order to adjust the detector along the axis X set screw 87 is either tightened to urge adjustment piece 85 and detector 84 in a first direction, e.g., to the right, or loosened so that resilient member 89 urges the detector in the opposite direction, e.g., to the left. Similar adjustment may be made along a perpendicular axis by the set screw and resilient member which are not shown. And more complex adjustments may be made by adjusting both set screws. When the desired position for detector 84 is achieved, screws 91 which extend through collar 78 and into adjustment piece 85, are tightened to fix adjustment piece 85 and detector 84 in place.

Detector 84 is connected via lines 86 to a signal processor 88 which may be disposed in the lowermost region of lower housing portion 17 or otherwise associated with the housing. The signal processor may itself be connected to various types of audio or visual indicating mechanisms such as digital readouts, dials and printouts.

Typically, each of the distances between lower end 21 of fiber 18 and center line 83 of lens system 71 and between center line 83 and detector 84 is twice the focal length of the lenses.

Figure 3:
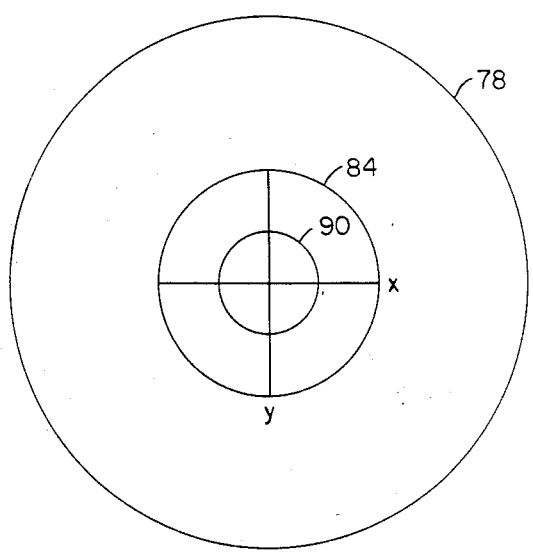
FIG. 3 is a top view of a spot of radiation from the quartz fiber projected onto the detector with the tilt meter in an upright condition.

With tilt meter 10 on a perfectly level surface, optical fiber 18 depends essentially perpendicularly from mounting member 56. The fiber is centered within tubular stop 28 and is aligned with the axial center of four-quadrant detector 84. Infrared radiation emitted by IRED 60 is conducted by quartz fiber 18 and emitted by distal end 21 of the fiber. An infrared image is transmitted through window 24 and is directed by lens system 71 to appear as a perfectly centered spot of radiation 90, FIG. 3, on detector 84.

Figure 4:
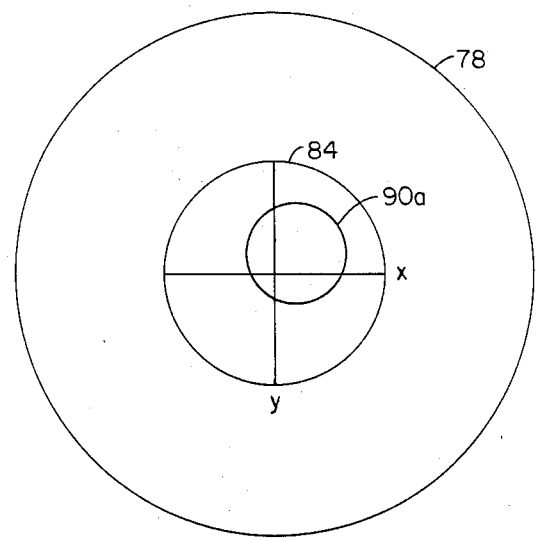
FIG. 4 is a view similar to FIG. 3 with the tilt meter in an inclined condition.

In operation, tilt meter 10 is placed on a surface of interest such as Table 12, FIG. 1. As shown in phantom in FIG. 2, pendulous mass 20 and quartz fiber 18 are caused to tilt, for example, in the direction or 92. Due to the low internal hysteresis of optical quartz fiber 18, the fiber bends freely without sticking. As a result, the infrared radiation transmitted and emitted by quartz fiber 18 is directed by lens system 71 to strike detector 84 at the axially displaced position on detector 84, shown by light spot 90a, FIG. 4. DC signals representative of the intensity of the light falling in the respective detector quadrants, and hence the positions of spots 90 and 90a, are provided to signal processor 88, FIG. 2, which compares and otherwise processes those signals to determine the degree of inc inclination of surface 12. The calculated inclination is then provided to an appropriate indicator.

As fiber optic 18 and mass 20 are deflected in the direction of arrow 92 their motion is damped by fluid 29. As a result, high-frequency vibrations which are caused by sudden and transitory movements of the device, bumping of the table, inadvertent jostling and other circumstances which are not indicative of an inclined surface to be measured are eliminated. Only low-frequency vibrations which do indicate genuine inclinations of interest are sensed.

The degree of deflection of the optical fiber and the pendulous mass are also limited by tubular stop 28. This prevents fiber 18 from bending excessively and therefore breaking under the weight of pendulous mass 20 when the device is inverted such as during transport.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A two-axis quartz fiber passive tilt meter comprising:
   a housing;
   a quartz fiber suspended from said housing for conducting radiation and emitting said radiation from a distal end thereof;
   a pendulous mass suspended from said quartz fiber;
   a damping fluid in said housing surrounding said quartz fiber and said mass, said damping fluid having an index of refraction close to that of said quartz fiber for optically cladding said fiber; and
   detector means for sensing the position of a spot of radiation emitted from said quartz fiber.

2. The tilt meter of claim 1 further including a mechanical stop mounted within said housing proximate said mass for limiting horizontal movement of said mass to limit bending of said quartz fiber.

3. The tilt meter of claim 2 in which said mechanical stop includes tube means which surround said quartz fiber and said pendulous mass.

4. The tilt meter of claim 3 further including fluid communication means interconnecting said tube means and the interior of said housing for transmitting damping fluid therethrough.

5. The tilt meter of claim 1 in which said quartz fiber is disposed through said pendulous mass.

6. The tilt meter of claim 1 in which said pendulous mass is suspended proximate the distal end of said quartz fiber.

7. The tilt meter of claim 1 in which said tilt meter is constructed of nonmagnetic material.

8. The tilt meter of claim 1 further including a source of radiation mounted in said housing for introducing radiation to said fiber.

9. The tilt meter of claim 8 in which said source of radiation includes a light-emitting diode.

10. The tilt meter of claim 1 in which infrared radiation is conducted through said quartz fiber.

11. The tilt meter of claim 10 in which said infrared radiation includes a wavelength of 880 nanometers.

12. The tilt meter of claim 1 in which said detector means includes a sensor and lens means for directing said radiation emitted by said quartz fiber to a spot on said sensor.

13. The tilt meter of claim 1 in which said detector means includes a four quadrant detector.

14. The tilt meter of claim 1 further including a window mounted in said housing between the light-emitting end of said quartz fiber and said detector means.

* * * * *